Figure 1:
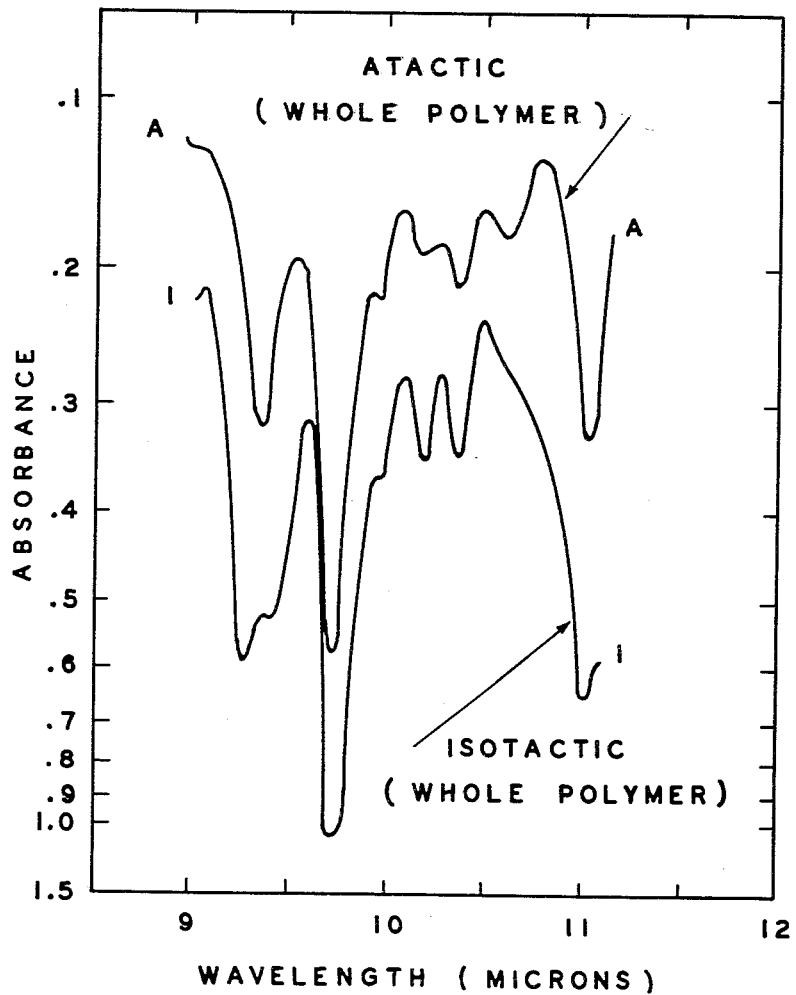

MYER EZRIN
ROBERT A. ISAKSEN
SEYMOUR NEWMAN
ROLF BUCHDAHL

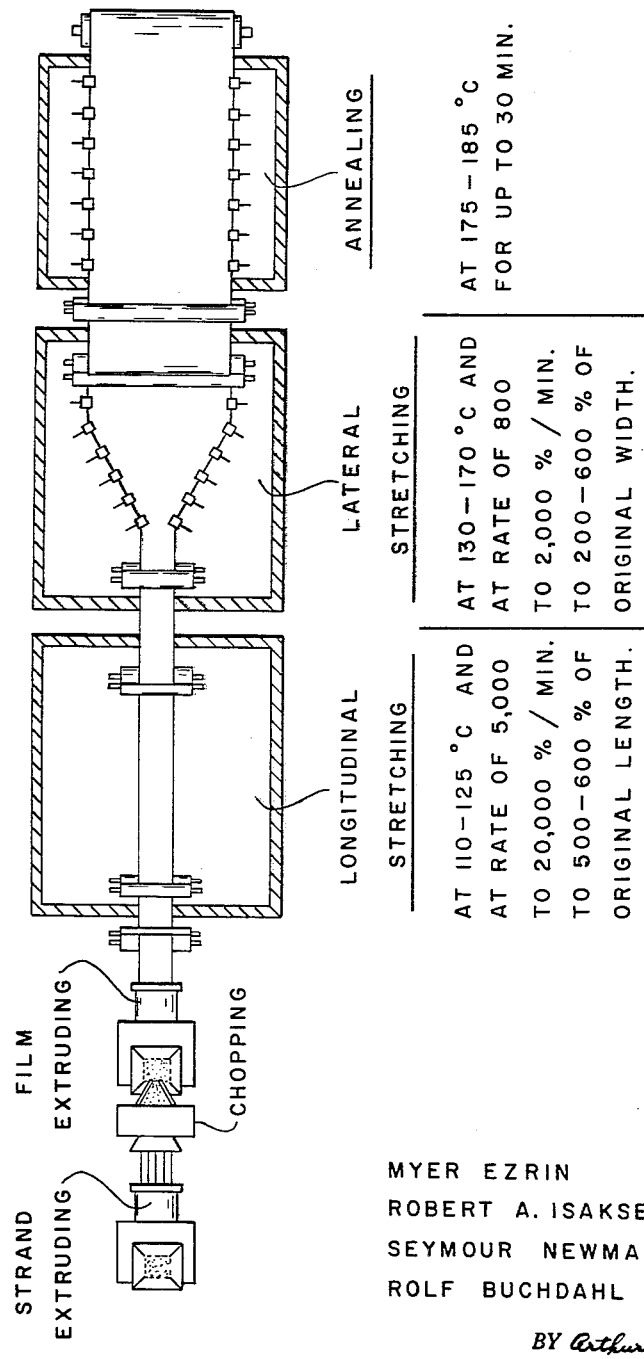

United States Patent Office

3,052,924
Patented Sept. 11, 1962

3,052,924
PROCESS FOR THE MANUFACTURE OF BI-AXIALLY ORIENTED CRYSTALLINE POLYSTYRENE
Myer Ezrin, Springfield, Robert A. Isaksen, Chicopee Falls, Seymour Newman, Springfield, and Rolf Buchdahl, Longmeadow, Mass., assignors to Monsanto Chemical Company, St. Louis, Mo., a corporation of Delaware
Filed Sept. 28, 1959, Ser. No. 842,889
4 Claims. (Cl. 18—48)

The present invention relates to the production of films and more particularly to the production of biaxially oriented crystalline polystyrene films exhibiting improved tensile strength.

Conventional polystyrene, hereinafter referred to as atactic polystyrene, is characterized by an amorphous, noncrystallizable nature, and is soluble in many common organic solvents such as benzene, naphtha, carbon tetrachloride and the like. While it has been proposed that atactic polystyrene can be stretch-oriented into films, the products which result remain amorphous, as well as soluble in common organic solvents. Additionally, it has been determined that films stretch-oriented from atactic polystyrene retract or lose this orientation when the films are subjected to temperatures in excess of 90° C. Consequently, these films have little utility in high temperature applications.

Accordingly, it is the principal object of the present invention to provide a process by which to produce biaxially oriented polystyrene films adapted for high temperature usages.

Another object is to provide a process by which to produce biaxially oriented polystyrene films exhibiting improved qualities of tensile strength.

These and other objects of the invention are attained in a method for producing biaxially oriented crystalline polystyrene films which are essentially insoluble in common organic solvents under room conditions and retain orientation up to about 200° C. which comprises (a) introducing 2–15% crystallinity into a substantially amorphous isotactic polystyrene member by stretching said member 500–600% of the original length along the longitudinal axis thereof, at a rate of 5,000–20,000% per minute and a temperature ranging from above about 110–125° C. and thereafter while maintaining longitudinal stretch, (b) stretching the crystalline isotactic polystyrene member along the transversal axis thereof 200–600% of the original width at a rate of 800–2000% per minute under a temperature of 130–170° C., and (c) at least after longitudinal stretching thereof, annealing the stretched member at a temperature of 175–185° C. for a finite period of up to 30 minutes.

The following examples are provided in illustration of the present invention. Where parts are mentioned, they are parts by weight unless otherwise described.

EXAMPLE I

Ninety-nine parts of styrene monomer and one part of triethylaluminum-titanium tetrachloride catalyst are charged into a reaction kettle. The molar ratio of aluminum to titanium in the catalyst is about 3.0:1.0. The vessel is raised to a temperature of 65–75° C. and maintained at this temperature until 20% conversion of the monomer charge takes place. A quantity of methanol sufficient to react with the catalyst, is provided into the reaction mixture to bring about termination of the polymerization reaction. The methanol contains 1.0% hydrochloric acid.

The polymerization product, which is in solid form, is filtered and washed in a Büchner funnel with methanol. After removal from the funnel, the product is placed in a reflux vessel with methyl ethyl ketone, the weight ratio of methyl ethyl ketone to product being about 15:1. Atmospheric refluxing is carried on for a period of about 16 hours. The solid polymer is then filtered and washed repeatedly in a Büchner funnel with methyl ethyl ketone. It is then dried to constant weight under vacuum at a temperature of 110–120° C.

The polymer product is determined to contain isotactic polystyrene having a molecular weight of 3–4 million. Molecular weight is inferred from measuring the intrinsic viscosity of a solution of the polystyrene in o-dichlorobenzene containing 0.2–0.3 part of ditertiary butyl p-cresol at 25.0° C.±0.02° C. Solvation of the isotactic polystyrene in the o-dichlorobenzene is facilitated by the use of temperatures of 170–175° C. together with shaking for about 15 minutes.

Using Soxhlet extraction with methyl ethyl ketone, carried on for a period of about 20 hours, the polymer exhibits the presence of less than 2% by weight of methyl ethyl ketone-soluble isomer.

*Longitudinal Stretch-Orientation—Method A*

A portion of the isotactic polystyrene product of Example I is placed in an extruder and heated to equilibrium temperature at 285–290° C., then extruded in a number of square strands. These strands are directed through a chopper to provide 0.125 inch cubes or pellets of isotactic polystyrene.

The pelletized material is charged into a second extruder, fitted with a sheet die head and brought to an extrusion temperature of 285–290° C. Upon reaching temperature equilibrium the material is extruded as a film or sheet 0.1 inch (100 mils) in thickness and 10 inches in width. The film is allowed to cool to room temperature, in effect air-quenching the same. The cooled film has a density of 1.055 indicating that it is sufficiently amorphous for present purposes. A section of the film, 2 feet in length, is brought to a temperature of 120° C. in a heated chamber and while so maintained is stretched unilaterally (along the longitudinal axis) 550% of its initial length at a rate of 15,000% per minute. The uniaxially stretch-oriented film, which is now 13 feet x 0.5 foot in area and 13 mils thick is allowed to cool to room temperature. On being tested, it evidences a density of 1.062, indicative of about 10% crystallinity. After being cooled, the uniaxially oriented film is self-supporting over its stretched length. Consequently, it is unnecessary for it to be retained under tension at this stage.

*Longitudinal Stretch-Orientation—Method B*

Another portion of the isotactic polystyrene product of Example I is subjected to the entire procedure of method A. Thereafter, the uniaxially oriented film is placed unsupported in an annealing oven maintained at 180° C. for 5 minutes. The material is removed from the oven and allowed to cool to room temperature. The film has the same dimensions as the film produced according to method A, but the present film has a density of 1.074–1.076 indicative of 30–35% crystallinity.

*Transversal Stretch-Orientation—Method C*

The film material produced according to method A above is cut into sections 1 foot in length (along the longitudinally stretched axis) x 6 inches in width. Each of these sections is clamped at four sides in a laboratory, lazytongs type cross-stretcher. The cross-stretcher is energized to stretch the film transversely of the axis (longitudinal) which is already stretched while maintaining the longitudinally stretched length constant. Stretching is provided at a temperature of 140° C. at a rate of 1200% per minute to an extent of 500% of the original width. Each of the sample films now measures 1 foot x 2.5 feet x 2.3 mils in thickness.

One half of the film sections are removed from the cross-stretcher immediately after transversal stretching and allowed to cool to room temperature. Reference will be made to these film sections as: Film C-intermediate unannealed; post unannealed (C–IU–PU)[1].

The remaining half of the above film sections are then annealed by retaining them in the cross-stretcher under full biaxial tension and a temperature of 180° C., for a period of 15 minutes after reaching temperature equilibrium. Reference will be made to these film sections as: Film C-intermediate unannealed; post annealed (C–IU–PA).

*Transversal Stretch-Orientation—Method D*

Film materials produced in accordance with method B above are cut into sections 1 foot in length (stretched) x 6 inches in width. The sections are clamped at their four sides in the cross-stretcher. The sections of film are stretched 500% of the original width along their transversal axes while their lengths are maintained constant. Stretching is carried out at a rate of 1200% per minute and under a temperature of 165° C. Each of the sample films now measures 1.0 foot x 2.5 feet x 2.3 mils in thickness.

One half of the film sections are removed from the cross-stretcher immediately after transversal stretching is completed and allowed to cool to room temperature. Reference will be made to these films as: Film D-intermediate annealed; post unannealed (D–IA–PU).

The remaining film sections above are annealed by retaining them in the cross-stretcher under full biaxial tension and a temperature of 180° C. for a period of 15 minutes. Reference will be made to these film materials as: Film D-intermediate annealed; post annealed (D–IA–PA).

EXAMPLE II

A reaction vessel is charged with 99.9 parts by weight of styrene monomer and 0.1 part by weight of ditertiary butyl peroxide. The temperature of the vessel is raised to 100° C. and maintained for a period of 40 hours. The polystyrene product is removed as a solid from the reaction vessel and granulated by crushing. This material is determined as being atactic polystyrene.

The atactic polystyrene is pelletized into 0.125 inch cubes by first extruding strands of same at an extrusion temperature of 260–280° C. followed by chopping the strands into 0.125 inch lengths. A sheet is formed from the pelletized material which is 0.1 inch in thickness and 10 inches in width. The extrusion temperature for this ---
[1] Intermediate annealing refers to annealing carried out after the initial or longitudinal stretching and prior to transversal stretching, while post annealing refers to that carried out after biaxial stretching has been completed.

is again 260–280° C. The film, after being cooled to room temperature, is noted to have a density of 1.045, attesting to its being amorphous, and incidentally it is atactic in form.

A section of the film, 2 feet in length, is brought up to a temperature of 110° C. in an air circulating oven, and while so maintained is longitudinally stretched 550% of its initial length at a rate of 15,000% per minute. The uniaxially stretched polystyrene is allowed to cool to room temperature and thereafter cut into one-foot sections. These sections are clamped in the hydraulic cross-stretcher and while being maintained under 110° C. and at their longitudinally stretched lengths (under tension), are stretched along the transversal axes, to 500% of the original width, at a rate of 1200% per minute. In carrying out this second or transversal stretching operation, the stretching temperature followed by stretching should be quickly effected in order that relaxation of the longitudinal orientation be kept to a minimum. While maintaining the biaxially stretch-oriented atactic polystyrene sheets under full biaxial tension, they are quickly cooled or quenched to room temperature by subjecting them to a blast of air refrigerated to 0° C. Thereafter tension is relieved nad the sections removed from the cross-stretcher.

TESTING PROCEDURES—PRODUCT

Specimens of each of the film sections provided in Example I, methods C and D and Example II are tested in accordance with the following test procedures.

(a) Density/ASTM D1505–57T
(b) Yield stress  
 Fail stress  
 Yield elongation  } ASTM D638–58T  
 Fail elongation  
 Young's modulus
(c) MIT fold endurance/ASTM D643–43
(d) Dielectric constant } ASTM D150–54T  
 Dissipation factor
(e) Melting point: Using 350× (power) polarizing microscope.
(f) Solvent resistance: Specimens 1 inch x 1 inch x 10 mils are placed in 100 ml. of reagent grade benzene @ S.T.P. Every 5 minuts the samples are removed with tweezers and visually inspected for swelling and relaxation or dimensional shrinkage. Time reported refers then to first evidence of swelling.
(g) Thermal dimensional stability: Specimens 0.5 inch x 2 inches x 10 mils are clamped in an oven in a perpendicular planar position at 200° C. and loaded (weights hung from the bottom of the specimen) to 820 p.s.i. The distance between clamps is measured with a cathetometer immediately of placing the specimens in the oven. After 10 minutes, the distance between clamps is again measured and changes noted. The results of the foregoing tests are as follows:

TABLE I

| Test | Specimens | | | | |
|---|---|---|---|---|---|
| | C–IU–PU | C–IU–PA | D–IA–PU | D–IA–PA | Atactic PS (Ex. II) |
| (a) Density (grams/cc.) | 1.064±.001 | 1.074±.001 | 1.074±.001 | 1.074±.001 | 1.047±.002 |
| Percent crystallinity | 14 | 30 | 30 | 30 | 0.00 |
| (b) Yield stress (p.s.i.) | 11,500–12,000 | 13,000–13,500 | 13,000–13,500 | 13,000–13,500 | 9,700–11,000 |
| Fail stress (p.s.i.) | 13,500–14,000 | 15,000–15,500 | 15,000–15,500 | 15,000–15,500 | 7,200–8,000 |
| Yield elong. (percent original length) | 6.0 | 6.0 | 6.0 | 6.0 | 5.0 |
| Fail elong. (percent original length) | 50.0 | 40.0 | 40.0 | 40.0 | 5–12 |
| Young's Mod. (p.s.i. x 10⁵) | 3.0–5.0 | 4.0–6.0 | 4.0–6.0 | 4.0–6.0 | 3.4–4.0 |
| (c) MIT fold endurance (number of folds) | 500–2,000 | 500–2,800 | 500–2,800 | 500–2,800 | 230–1,400 |
| (d) Dielectric constant | 2.45 | 2.45 | 2.45 | 2.45 | 2.45 |
| Dissipation factor | 0.0003 | 0.0003 | 0.0003 | 0.0003 | 0.0003 |
| (e) Melting point (° C.) | 234 | 234 | 234 | 234 | [1] None |
| (f) Solvent resistance (min. to perceptible change) | 60 | 180 | 180 | 180 | [2] |
| (g) Thermal dimensional stability (percent shrinkage) | 2.5 | <1.0 | <1.0 | <1.0 | 80 |

[1] Amorphous. [2] Completely dissolved within 5 minutes.

Consideration of the above table leads to the following conclusions: (a) The density data, which are reflective of the amount of crystallinity in the film samples, indicate that the film samples prepared according to the dictates of the present invention, whether the required annealing be provided before or after transversal stretching, evidence a high amount of crystallinity, i.e., 30% crystallinity as compared to 14% for the biaxially stretched unannealed samples, and 0% for atactic polystyrene, where each of the film samples has been stretch-oriented to the same amount. Note too, that the film samples of crystallizable polystyrene which are biaxially oriented in the prescribed amounts, but which are not annealed (C–IU–PU), do however evidence sufficient crystallinity, i.e., 14% as to insure successful products if the prescribed annealing is carried out on the same. In this regard, 2–15% crystallinity resulting from stretch-orientation, uniaxially or biaxially instituted, is sufficient to obtain biaxially oriented film products having the desired amount of crystallinity, i.e., 30–40%. (b) The tabulated tensile data also indicate that the film products derived from practice of the present invention have greater strength and toughness than have either its unannealed isotactic counterpart, or the atactic polystyrene specimens. (c) From the MIT fold endurance test data it can be concluded that the films produced in accordance with the present invention have superior resistance to repeated sharp creasing. Regarding (d) the dielectric constant and dissipation factor, it can be stated that the presently featured biaxially stretch-oriented and annealed film products of isotactic polystyrene exhibit the same excellence in these properties as is true of polystyrene in general. (e) The melting point data, of course, reflect that the isotactic polystyrene film products and intermediate products of the present invention develop crystallinity. Particularly notable however, is the performance of the film materials of the present invention when submitted to the (f) solvent resistance and (g) thermal stability or shrinkage tests.

The present invention relates to a method for producing biaxially oriented crystalline polystyrene films which are essentially insoluble in common organic solvents under room conditions and retain orientation up to about 200° C. The featured method comprises (a) introducing 2–15% crystallinity into a substantially amorphous isotactic polystyrene member by stretching said member 500–600% of the original length along the longitudinal axis thereof at a rate of 5,000–20,000% per minute under a temperature ranging from above about 110–125° C. and thereafter while maintaining longitudinal stretch, (b) stretching the member along the transversal axis thereof 200–600% of the original width at a rate of 800–2000% per minute under a temperature of 130–170°C., and (c) at least after longitudinal stretching thereof annealing the stretched member at a temperature of 175–185° C. for a finite period of up to 30 minutes.

GENERAL DISCUSSION

*Substantially Amorphous Isotactic (Crystallizable) Polystyrene Starting Material*

Recent work has developed crystallizable polystyrene. One such polystyrene is that termed "isotactic" polystyrene by G. Natta and P. Corradini, Makro. Chemie 16, 77–80 (1955). Another proposed crystallizable polystyrene is "syndiotactic" polystyrene. Crystallizable polystyrene need not contain actual crystallinity as such and in this latter form can be referred to as amorphous crystallizable polystyrene or amorphous isotactic polystyrene. Members or films of this latter, i.e., the amorphous isotactic or amorphous crystallizable polystyrene, serve as starting materials for the present invention. Once having become crystallized, it can be referred to simply as crystalline polystyrene or crystalline isotactic polystyrene.

Noncrystallizable or atactic polystyrene, and isotactic polystyrene are apparently reflective of their sources and more particularly of the polymerization processes by which they are obtained. Atactic polystyrene is obtained through homogeneous polymerization processes utilizing free radical catalysts, such as the peroxides including benzoyl peroxide and the like. Crystallizable or crystalline polystyrene and specifically isotactic polystyrene, can be produced by heterogeneous polymerization processes utilizing organometallic-transition metal halide catalysts, for example, a triethyl-aluminum-titanium tetrachloride catalyst.

The isotactic polystyrene which is particularly desirable for practice of the present invention has a molecular weight range of 200,000 and greater as determined from measuring the intrinsic viscosity of a solution of the polystyrene in o-dichlorobenzene containing 0.2–0.3 part of ditertiary butyl p-cresol at 25.0° C.±0.02° C. Actually the upper limit of molecular weight is best determined in view of the melt viscosity evidenced by the material while being extruded into film starting material. At molecular weights greater than about 7,000,000 difficulty is encountered in producing satisfactory film. A more preferred range is 600,000 to 5,000,000.

The existence of isotactic polystyrene can be established through a number of tests. These tests include appraisal of (a) density (absolute density), (b) solubility, (c) melting point and (d) X-ray diffraction analysis, all of which are preferably carried out on a sample of the material which has been first subjected to a particular thermal treatment, which is designed to convert all of the isotactic polystyrene present to the crystalline form. This is necessary for the reason that some of the tests above and particularly tests (a) density, (c) melting point (inherent) and (d) X-ray, are capable only of distinguishing between crystalline and noncrystalline materials. The atactic polystyrene on the other hand, does not crystallize during the thermal treatment, but rather remains amorphous.

Taking the density test as illustrative; if the density is found to exceed 1.054 grams/cm.$^3$, the material can be considered to contain crystallinity, it having been determined that the presence of crystalline isotactic polymer is reflected by densities ranging between 1.054–1.124 grams/cm.$^3$. In like manner, the solubilities and the melting points of crystalline isotactic polystyrene will characteristically differ from thermally treated atactic polystyrene which retains its amorphous characteristics.

Representation of thermal treatment which can be carried out prior to taking the above defined measurements, i.e., density, melting point, etc., a sample of the polystyrene to be tested is compression molded and then subjected to a temperature of 175–185° C. for a period of 2 hours. The density of the thermally treated sample is determined by comparing its weight taken in a liquid of known density, such as water, with its weight taken in air. Samples of polystyrene produced in accordance with the process of Example I, being thermally treated in the described manner, normally exhibit densities of about 1.08 grams/cm.$^3$.

Another test which can be carried out to determine whether a given polystyrene is isotactic, as compared to atactic, involves the use of infrared spectrum analysis. A thin specimen of the polystyrene to be tested is prepared by molding or casting from solution. The specimen is then tested in a Perkin-Elmer, model No. 21, Double Beam Infrared Recording Spectrometer. Atactic polystyrene shows a band at 9.35 microns, whereas isotactic polystyrene exhibits a doublet at about 9.25 microns and 9.45 microns. In addition, the band at 10.6 microns observable in atactic polystyrene is missing in the isotactic isomer. This procedure is capable of determining the existence of crystallizable isotactic polystyrene directly and does not require that the sample be subjected to thermal pretreatment in order to institute crystallinity as in the case of the prior tests such as density, etc. Typical spectra for atactic polystyrene and isotactic polystyrene are shown at FIG. 1. Curve A is indicative of atactic polystyrene whereas curve I is that for isotactic polystyrene. Point (*i*) indicates the position of the doublet referred to while point (*a*) indicates the position of the 10.6 microns band.

As indicated above, it is possible to have both atactic and isotactic isomers present in a given mass of polystyrene. In order to separate the two and obtain at least a high concentration of the isotactic isomer in the polymer product, the mass is fractionated. One successful procedure for this is by solvent extraction using acetone, methyl ethyl ketone, toluene or other common organic solvents in which the atactic isomer is soluble. In Example I, this is accomplished by using methyl ethyl ketone.

The polystyrene which is preferred as a starting material for producing the biaxially oriented films of the present invention, is isotactic polystyrene which is essentially amorphous, in other words, it should contain practically no crystallinity, the same being less than the amount of crystallinity indicated by the material having a density of less than about 1.06. Greater than this amount of crystallinity in the starting material generally leads to fracture or rupture of the film when the same is subjected to the heat setting or annealing step following stretching. In order to determine the amount of crystallinity, the starting material and more desirable, a sample of the starting material is subjected to either the previously described density test, or to X-ray diffraction analysis, both of which are sufficiently quantitative as to the amount of crystallinity contained in a given sample. The density test is carried out as previously described.

If it is determined that the isotactic polystyrene film has greater than about 1.06 density, reflecting an excess crystallinity beyond that which is desirable, it is subjected to pretreatment designed to reduce the crystallinity below this critical amount and approaching an amorphous condition. Reduction of crystallinity can be accomplished by subjecting the isotactic polystyrene film to a temperature approaching and preferably above its melting point (about 234° C.). Since the orientation process will generally be in the nature of a continuous operation, the thermal pretreatment is incidentally carried out during extrusion of the film from a melt of the isotactic polystyrene. Other conditioning apparatus can, however, be used to perform the same operation on the film itself. If the orientation process is to be postponed in time, the isotactic polystyrene film which is in an amorphous state can be so maintained by cooling rapidly to a temperature below about 90° C. in air or liquid. Lowering of the temperature in effect freezes the polystyrene in the induced amorphous state. In the continuous type operation, the proximity of the melt to the stretching step generally eliminates the need for this cooling.

*Preparation of Amorphous Isotactic Polystyrene Film*
*(Starting Material)*

Provision of the crystallizable polystyrene in sheets or films capable of being stretched can best be attained by a double extrusion process. During the first extrusion, the polystyrene is heated to an equilibrium temperature of 285–290° C. and extruded in the form of fine rods, which can have round, square or other convenient cross-sectional configuration. The extruded rods are then chopped or otherwise formed into pellets. Pellets which are in effect 0.125 inch cubes are quite satisfactory for this purpose. In the second extrusion, the pelletized material is again heated to an equilibrium temperature of 285–290° C. and extruded through a film-die head. The film which results can have any convenient dimensions, note however, that the film is intended to be stretch-oriented both longitudinally and transversally in considerable amounts, i.e., on the order of six magnitudes. The thickness of the film on the other hand will be decreased with stretching. These aspects should be taken into consideration, when choosing the film-die head for dimensions. To illustrate, biaxially oriented crystalline polystyrene film 48 inches in width and 15 mils in thickness, can be continuously produced from a starting film 12 inches in width and 150 mils in thickness.

If upon being extruded, the film is to be immediately directed to the stretching operation, a defined quenching step is unnecessary to insure that the crystallizable polystyrene film be amorphous in nature. In this regard however, the film cannot be maintained at greater than 150° C. for a period longer than about 1 minute without crystallization taking place. If the latter does occur, then heating and quenching of the film, in the manner previously discussed, is necessary to provide the crystallizable polystyrene film in amorphous condition.

*Initial or Longitudinal Stretch-Orientation Step*

As indicated earlier, the film or member of amorphous crystallizable or isotactic polystyrene is initially subjected to a longitudinal stretching of 500–600% of the original length at a rate of 5,000–20,000% per minute under a temperature ranging from above about 110–125° C. In doing so, the film attains 2–15% crystallinity which is necessary to insure against relaxation or loss of longitudinal orientation during the heat-up of the film, preliminary to the second or transverse stretching of the film. As to the percent stretch of 500–600%, if below the lower limit of 500% is used, the member will not attain the desired amount of crystallinity. If more than the upper limit of 600% stretch is used, the member fractures during the stretching operation. With respect to the rate of stretch, i.e., 5,000–20,000% per minute, if less than the lower limit is used, the desired amount of crystallinity is not developed in the film, while at rates of stretch higher than 20,000%/min. the member, or film, fractures during the present stretching step. A more preferred limit of stretch rate ranges 15,000–18,000% per minute. The temperature chosen, that ranging from above about 110–125° C., represents a temperature range above the second order transition temperature of crystallizable polystyrene which latter ranges 100–110° C. Second order transition temperature can also be referred to as glassy transition temperature, represented Tg. Actually at temperatures up to and about 110° C., the film material will cold-draw which is a localized type of stretching, whereas hot, or homogeneous stretching which occurs above 110° C. is the desired type of stretching. Above 125° C., stretching in the indicated amounts results in little retention of orientation and insufficient crystallinity in the film materials. In other words, orientation and relaxation are competing processes which act to nullify one another. A more preferred range for these temperatures are 117–123° C. It should be noted, that the three conditions mentioned above are interdependent and that changes made in one or more of the ranges set forth, will require compensation in the remaining conditions, all of course, remaining within the ranges as designated.

Longitudinal stretching can be effected in a continuous manner on a stretching frame constituting a series of rolls in tandem or cascade. The rolls are operated at different forward speeds, the after rolls being operated at relatively higher speeds with the differential in speeds being designed to introduce the desired amount of stretch at the desired rate of stretch into the film material. The stretching frame, and effectively the stretching rolls, are maintained in an atmosphere which is maintained at a temperature ranging from above about 110–125° C. by forced heated air. The same function can also be accomplished by using heated rolls. This is less desirable however, than the preceding method. The amorphous isotactic polystyrene can be continuously introduced to the stretching apparatus in the form of extruded members, more particularly sheets or films.

Second or Transversal Stretch-Orientation Step

While effectively maintaining the longitudinal stretched length or extension, the isotactic polystyrene sheet, film or member is subjected to a second or transversal stretch-orientation step. Incidentally, the film may or may not have been subjected to an annealing step intermediate of the two stretching operations. Transversal stretch-orientation is provided in the film to the extent of 200–600% of the original width at a rate of 800–2,000% per minute under a temperature of 130–170° C. With less than 200% stretch, the film develops less than desirable tensile strength along the transversal or lateral axis, i.e., that axis which is in transversal relationship to the axis is in which the initial or longitudinal stretching is provided. when greater than 600% stretch-orientation is attempted, the film ruptures or tears. When stretching is performed at a rate of less than 800% per minute, insufficient orientation along the transversal axis is obtained, and when a rate of greater than 2,000% per minute is attempted, the film tears. Choice of temperature, i.e., 130–170° C. results from the determination that transversal stretching carried on below those temperatures result in rupture of the film while transversal stretching carried out above the upper limit, results in less than a desirable amount of orientation being retained in the film. Note that the choice of a transversal stretching temperature with the disclosed range depends somewhat upon whether the film has been annealed prior to the transversal stretching operation. Where the material is intermediately annealed, a temperature range of 160–170° C. is required. This reflects the proposition that the crystallinity introduced in the longitudinal stretching operation has been set in the film, thus, caused the film to be more resistant to the later attempted transversal stretching operation. when the intermediate annealing step has not been performed, the film is less resistant to transversal stretching and the lower temperatures in the range can be utilized.

Transversal or lateral stretch-orientation can be effected in the film by directing the longitudinally stretched film into a tenter-frame type or other convenient cross-stretcher capable of providing the extent and rate of lateral stretching prescribed, while simultaneously maintaining the film under sufficient longitudinal tension as to prevent relaxation along the longitudinal axis. The tenter-frame can be maintained under an atmosphere heated to the prescribed temperature, 130–170° C., using forced or circulated hot air. In the case of continuous operation, the cross-stretcher is integrated with the apparatus expedient previously described for carrying on longitudinal stretching. This integration can incorporate the annealing apparatus used for intermediate annealing.

Annealing Stretch-Oriented Film

Annealing of stretch-oriented polystyrene film can be practiced (a) in a single instance after longitudinal stretching has been provided and prior to transversal or lateral stretching. This is referred to as intermediate annealing. (b) In a single instance after the second stretching operation, i.e., after transversal or lateral stretching. This is referred to as post annealing, and (c) in both instances above. Of the three possibilities, (a) above, a single annealing after longitudinal stretching, that is, intermediate annealing, is the preferred practice. The salient reason for the above preference is that lesser periods of time are required in which to practice the biaxial orientation process in toto.

Under any of the above circumstances, the stretching which is initiated in the film prior to annealing must be essentially maintained during the annealing step or steps. Consequently, when annealing is carried on after the initial or longitudinal stretching step, the stretched extension is protected by maintaining the stretched axis or axes under tension. When annealing is provided after the second or transversal stretching step, both of the now stretched axes are so retained by use of tension. Again, under either circumstance, some retraction of stretching can be accommodated, provided that the amount of longitudinal and/or transversal stretching which results falls within the ranges prescribed earlier for the same.

As indicated, annealing is carried out at 175–185° C. This range is chosen as facilitating a maximum rate of crystal growth. The period required for annealing is stated as ranging between a finite period and up to 30 minutes in duration. In the case of the intermediate annealing, the lesser periods, those ranging up to about 5 minutes and more particularly about 1 minute are sufficient for satisfactory performance. When post annealing, that carried on after the second or transversal stretching, is practiced, the longer periods within the prescribed range are required.

Annealing can be effected in an atmosphere heated to the prescribed amount. Satisfactory performance can be had in hot-air circulating ovens located at the after-end of either or both stretcher frames, i.e., the longitudinal and/or cross-stretcher frames. The ovens are provided with differential speed rollers in order for the film to be maintained under longitudinal tension while being advanced at speeds designed to provide proper residence of the film within the annealing ovens. The prescribed lateral tension, under which the films are to be maintained during post annealing, is provided for by the inclusion of a constant-width tenter-frame within the oven.

It will thus be seen that the objects set forth above, among those made apparent from the preceding description are efficiently attained, and since certain changes may be made in carrying out the above orientation process and in the resulting isotactic polystyrene products without departing from the scope of the invention, it is intended that all material contained in the above description shall be interpreted as illustrative and not in a limiting sense.

What is claimed is:

1. A method for producing biaxially oriented crystalline polystyrene members which are essentially insoluble in common organic solvents under room conditions and retain orientation up to about 200° C. which comprises (a) introducing 2–15% crystallinity into a substantially amorphous isotactic polystyrene member by longitudinally stretching said member 500–600% of the original length at a rate of 5,000–20,000% per minute under a temperature ranging from above about 110–125° C. and thereafter while maintaining longitudinal stretched extension, (b) stretching the longitudinally stretched crystalline isotactic polystyrene member along the transversal axis thereof 200–600% of the original width at a rate of 800–2,000% per minute under a temperature of 130–170° C. and (c) after stretching thereof, annealing the stretched member at a temperature of 175–185° C. for a finite period of up to 30 minutes.

2. The method according to claim 1 wherein annealing takes place after the isotactic polystyrene member has been biaxially stretched.

3. The method according to claim 1 wherein annealing takes place intermediate in time of the longitudinal and transversal stretching of said polystyrene member.

4. The method according to claim 1 wherein longitudinal stretching of said member is carried out at a temperature of 117–123° C.

References Cited in the file of this patent

UNITED STATES PATENTS 2,412,187     Wiley et al.  ------------- Dec. 3, 1946
2,627,088     Alles et al.  ------------- Feb. 3, 1953

(Other references on following page)

UNITED STATES PATENTS

| | | |
|---|---|---|
| 2,767,435 | Alles | Oct. 23, 1956 |
| 2,823,421 | Scarlett | Feb. 18, 1958 |
| 2,824,781 | Dellheim et al. | Feb. 25, 1958 |
| 2,900,220 | Shaw | Aug. 18, 1959 |
| 2,968,065 | Gronholz | Jan. 17, 1961 |
| 2,984,593 | Isaksen et al. | May 16, 1961 |
| 2,988,793 | Miller et al. | June 20, 1961 |
| 2,997,743 | Isaksen et al. | Aug. 29, 1961 |

FOREIGN PATENTS

| | | |
|---|---|---|
| 1,158,472 | France | July 4, 1956 |
| 419,900 | Great Britain | Nov. 21, 1934 |

OTHER REFERENCES

Baily: "Stretch Orientation of Polystyrene" from India Rubber World, May 1948, pp. 225–231.

"Polyflex Biaxially Oriented Polystyrene Film" from Rubber and Plastics Age, September 1958, page 775.